United States Patent
Niemi et al.

(10) Patent No.: US 10,091,831 B2
(45) Date of Patent: Oct. 2, 2018

(54) SYSTEM, METHOD, AND APPARATUS FOR SIGNALING INFORMATION FOR A REJECTED NETWORK CONNECTION

(71) Applicant: AVAGO TECHNOLOGIES GENERAL IP (SINGAPORE) PTE. LTD., Singapore (SG)

(72) Inventors: Marko Niemi, Oulu (FI); Jaakko Sitomaniemi, Oulu (FI)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 443 days.

(21) Appl. No.: 14/737,422

(22) Filed: Jun. 11, 2015

(65) Prior Publication Data

US 2015/0373770 A1   Dec. 24, 2015

Related U.S. Application Data

(60) Provisional application No. 62/013,686, filed on Jun. 18, 2014.

(51) Int. Cl.
  *H04L 12/58* (2006.01)
  *H04W 76/18* (2018.01)
  *H04W 48/12* (2009.01)

(52) U.S. Cl.
  CPC ........... *H04W 76/18* (2018.02); *H04W 48/12* (2013.01)

(58) Field of Classification Search
  None
  See application file for complete search history.

(56) References Cited

U.S. PATENT DOCUMENTS

2011/0007671 A1* 1/2011 Yu ................ H04L 61/6086
                                                   370/255
2015/0245256 A1* 8/2015 Kiss ................ H04W 12/06
                                                   455/436

OTHER PUBLICATIONS

European Search Report dated Nov. 30, 2015 in Patent Application No. 15001754.9.

(Continued)

*Primary Examiner* — Zewdu A Beyen
(74) *Attorney, Agent, or Firm* — Oblon, McClelland, Maier & Neustadt, L.L.P.

(57) ABSTRACT

A user equipment (UE) includes circuitry configured to establish a packet data network (PDN) connection with a first public land mobility network (PLMN) operated by a first network operator. A second PDN connection request is sent to a second PLMN operated by a second network operator that is equivalent to the first PLMN, and at least one action is determined based on receiving a reject message from the second PLMN having at least one of a cause value and a cause type.

18 Claims, 9 Drawing Sheets

(56) References Cited

OTHER PUBLICATIONS

HTC et al: "Handling of PDP context activation procedure in equivalent PLMN", $3^{RD}$ Generation Partnership Project (3GPP), C1-142275, XP 50778240, May 2014, 5 pages.
HTC: "Handling of ESM cause# 50, 51 and 66", $3^{RD}$ Generation Partnership Project (3GPP), C1-140456, XP 50747634, Jan. 2014, 6 pages.
Nokia Networks et al: "Using of list of equivalent PLMNs for MS session management retry", $3^{RD}$ Generation Partnership Project (3GPP), C1-151337, XP 50946966, Apr. 2015, 7 pages.
Nokia Networks et al: "Using of list of equivalent PLMNs for UE session management retry", $3^{RD}$ Generation Partnership Project (3GPP), C1-151338, XP 50946967, Apr. 2015, 9 pages.

* cited by examiner

| 8 | 7 | 6 | 5 | 4 | 3 | 2 | 1 | |
|---|---|---|---|---|---|---|---|---|
| SM Cause type IE | | | | 0 Spare | 0 Spare | 0 Spare | ePLMN | Octet 1 |

Fig. 4A

SM Cause Type IE values for bit-1

SM cause type value (ePLMN) (octet 1)

Bit
1
0   No additional information of cause type. If received it shall be interpreted as there is no additional information available for the received cause value.
1   The cause is effective in the PLMN in which received and its equivalent PLMNs.

Bits 4 to 2 of octet 1 are spare and shall be all coded as zero.

Fig. 4B

SYSTEM, METHOD, AND APPARATUS FOR SIGNALING INFORMATION FOR A REJECTED NETWORK CONNECTION

CROSS-REFERENCE TO RELATED PATENT APPLICATIONS

The present application claims the benefit of the earlier filing date of U.S. provisional application 62/013,686 having common inventorship with the present application and filed in the U.S. Patent and Trademark Office on Jun. 18, 2014, the entire contents of which being incorporated herein by reference.

BACKGROUND

Technical Field

The exemplary and non-limiting embodiments of the present disclosure relate to wireless communication systems, methods, and devices. More specifically, the present disclosure relates to signaling information to at least one user equipment (UE) when a request for a network connection is lost.

Description of Related Art

The 3GPP specifications group SA1 has specified equivalency between a public land mobility network (PLMN) and an equivalent PLMN (ePLMN) based on protocols and signaling for selection, reselection and handover. In practice, this basis for equivalency can cause problems for some network operators that can support a UE on one PLMN but may not necessarily support the UE on an ePLMN that may be considered equivalent by the criteria of SA1.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is an exemplary table illustrating bit positions for a first octet of a cause type information element, according to certain embodiments;

FIG. 4B illustrates exemplary values for a bit in a bit 1 position of the cause type information element, according to certain embodiments;

DETAILED DESCRIPTION

Figures 1A, 1B:
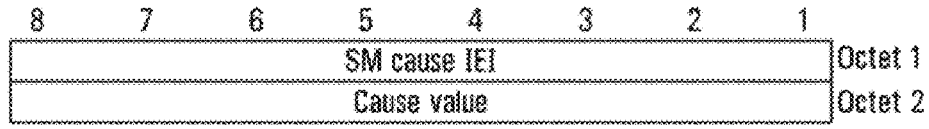
FIG. 1A is an exemplary related art illustration of a format for a session management (SM) cause value information element (IE), according to certain embodiments.
FIG. 1B is an exemplary list of meanings of SM cause values, according to certain embodiments.

In the drawings, like reference numerals designate identical or corresponding parts throughout the several views.

Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

In a first exemplary embodiment, a user equipment (UE) includes circuitry configured to establish a packet data network (PDN) connection with a first public land mobility network (PLMN) operated by a first network operator. A second PDN connection request is sent to a second PLMN operated by a second network operator that is equivalent to the first PLMN, and at least one action is determined based on receiving a reject message from the second PLMN having at least one of a cause value and a cause type.

In another exemplary embodiment, a method includes establishing a packet data network (PDN) connection with a first public land mobility network (PLMN) operated by a first network operator; sending a second PDN connection request to a second PLMN operated by a second network operator that is equivalent to the first PLMN; and determining at least one action based on receiving a reject message from the second PLMN having at least one of a cause value and a cause type.

In another exemplary embodiment, a user equipment (UE) includes circuitry configured to establish a connection to an external network via a first evolved packet core (EPC) associated with a first e-NodeB (eNB), send a request to connect to the external network via a second EPC associated with a second eNB, and determine at least one action based on receiving a reject message from the second eNB having one or more session management (SM) information elements (IEs).

Aspects of the present disclosure are directed to a UE operating in a General Packet Radio Service (GPRS) and/or a LTE network (E-UTRAN). The networks described herein are exemplary and are just one example of a suitable radio environment in which these teachings can be implemented and is used here only to provide a practical context for describing the inventive concepts detailed herein. These teachings may be utilized when the UE is operating in networks deploying other radio access technologies, such as for example UTRAN, which includes wideband code division multiple access (WCDMA), high-speed downlink packet access (HSDPA), and the like.

According to certain embodiments, a UE having a packet data network (PDN) connection on a first PLMN seeks to reselect to a second ePLMN that is considered to be equivalent according to SA1 equivalency criteria. A first network operator operates the first PLMN and a second network operator operates the second ePLMN. The second network operator may be unable to grant the UE's PDN request for the reselection due to a gateway of the second network operator between the second ePLMN and the Internet having an access point name (APN), such as internet.t-mobile, that is not compatible with the APN used by the UE with the first PLMN, and/or due to the gateway of the second network operator using an internet protocol (IP) that is not supported by the UE. In a GPRS radio system, communications to/from a mobile device/UE pass through GPRS serving nodes such as serving GPRS support nodes (SSGNs) and gateway GPRS support nodes (GGSNs). In the described example, the gateway is the GGSN since the GGSN is the node that interfaces the radio network to the external network, such as the internet.

In addition, in reply to the UE's PDN request, the second network operator can reply with a reject message to the UE that has a cause value which indicates the reason for the rejection. As an example, FIG. 1A is an exemplary related art illustration of a two-octet format for the session management (SM) cause value information element (IE), and FIG. 1B is an exemplary related art list of the meanings of the conventional SM cause values, according to certain embodiments. However, the related art cause values may not be able to inform the UE that the second ePLMN, which from the UE's perspective is equivalent and should be a viable PLMN, is not suitable for the UE.

Figure 2:
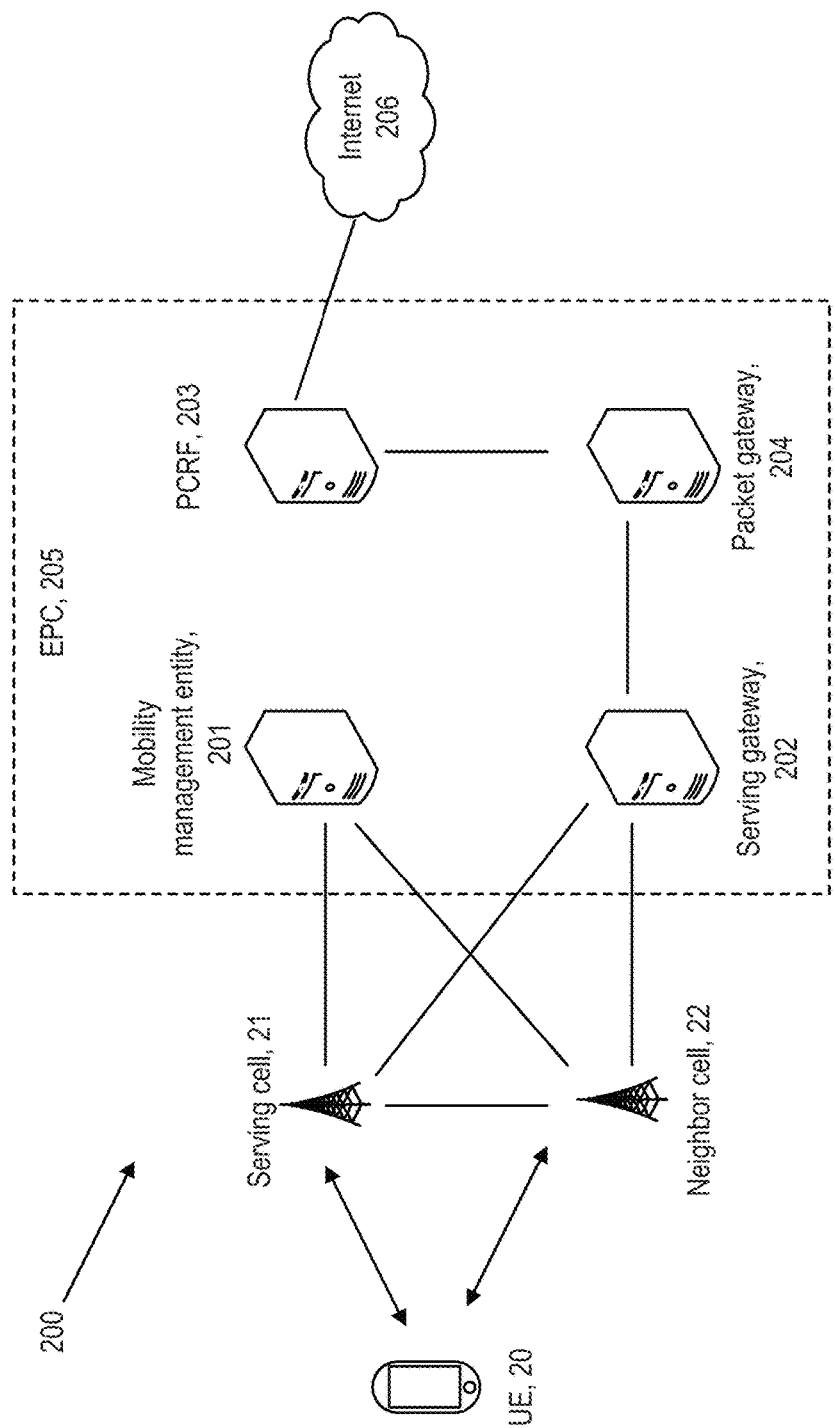
FIG. 2 is an exemplary illustration of a radio environment, according to certain embodiments.

FIG. 2 is an exemplary illustration of a radio environment 200, according to certain embodiments. The radio environment 200 can be interchangeably referred to as a radio network throughout the disclosure. A radio access network (RAN) can include network elements that communicate directly with a UE 20 via wireless communications such as serving cell 21 and neighbor cell 22. In U-TRAN and E-UTRAN environments, the serving cell 21 and neighbor cell 22 can be a Node B and an e-Node B (eNB), respectively. The Node B and eNB designations can include relays, remote radio heads, and the like. The radio network can include the RAN as well as a core network with which the RAN communicates. In FIG. 2, the core network is an evolved packet core (EPC) 205, which is specific to E-UTRAN. The EPC 205 includes a mobility management entity 201, a serving gateway 202 (S-GW in E-TRAN, which is equivalent to a SSGN in UTRAN) and a packet data network gateway 204 (P-GW in E-UTRAN, which is equivalent to a GGSN in UTRAN). The packet gateway 204 interfaces with the radio network, and particularly the core network/EPC 205, with a PDN which is shown as the internet 206 in FIG. 2. In other embodiments, the PDN can be some other type of extra-net, intra-net, or some other PDN external to the radio network.

In the radio environment 200, the serving gateway 202 provides internet network access and standard network access for the mobile devices associated with the radio access network, such as the UE 20. The serving gateway 202 and the mobility management entity 201 can be in direct communication with each other via cabling, wire, optical fiber, and/or transmission hardware (e.g., a router or repeater). The serving cell 21 and neighbor cell 22 are wirelessly in contact with the UE 20 via the illustrated bi-directional radio links. There may also be a backhaul link (e.g., an X2 interface) between the cells/eNBs directly, which may implemented as a broadband wired or optical connection between the eNBs. The illustrated connections between any individual eNB associated with serving cell 21 and/or neighbor cell 22, the mobility management entity 201, and the serving gateway 202 can be implemented as S1 interfaces in the E-UTRAN system.

Also shown for the EPC 205 in radio environment 200 is a policy and charging rules function (PCRF) node 203 that can be used to determine policy rules for communications that are ongoing or are requested for the radio access network. The PCRF node 203 can access subscriber databases of the UE's home network and request corresponding subscriber information from counterparts in the UE's home network if the EPC 205 is a visited network for the UE 20. The PCRF node 203 can also perform subscriber charging and other related functions.

In an exemplary implementation where the UE 20 reselects from the current serving cell 21 to the neighbor cell 22, both the serving cell 21 and the neighbor cell 22 use the same EPC 205 and the same packet gateway 204, so the network operator can grant the request for a PDN connection through the neighbor cell 22 so long as long as congestion, authentication, and other checks meet predetermined criteria.

Figure 3:
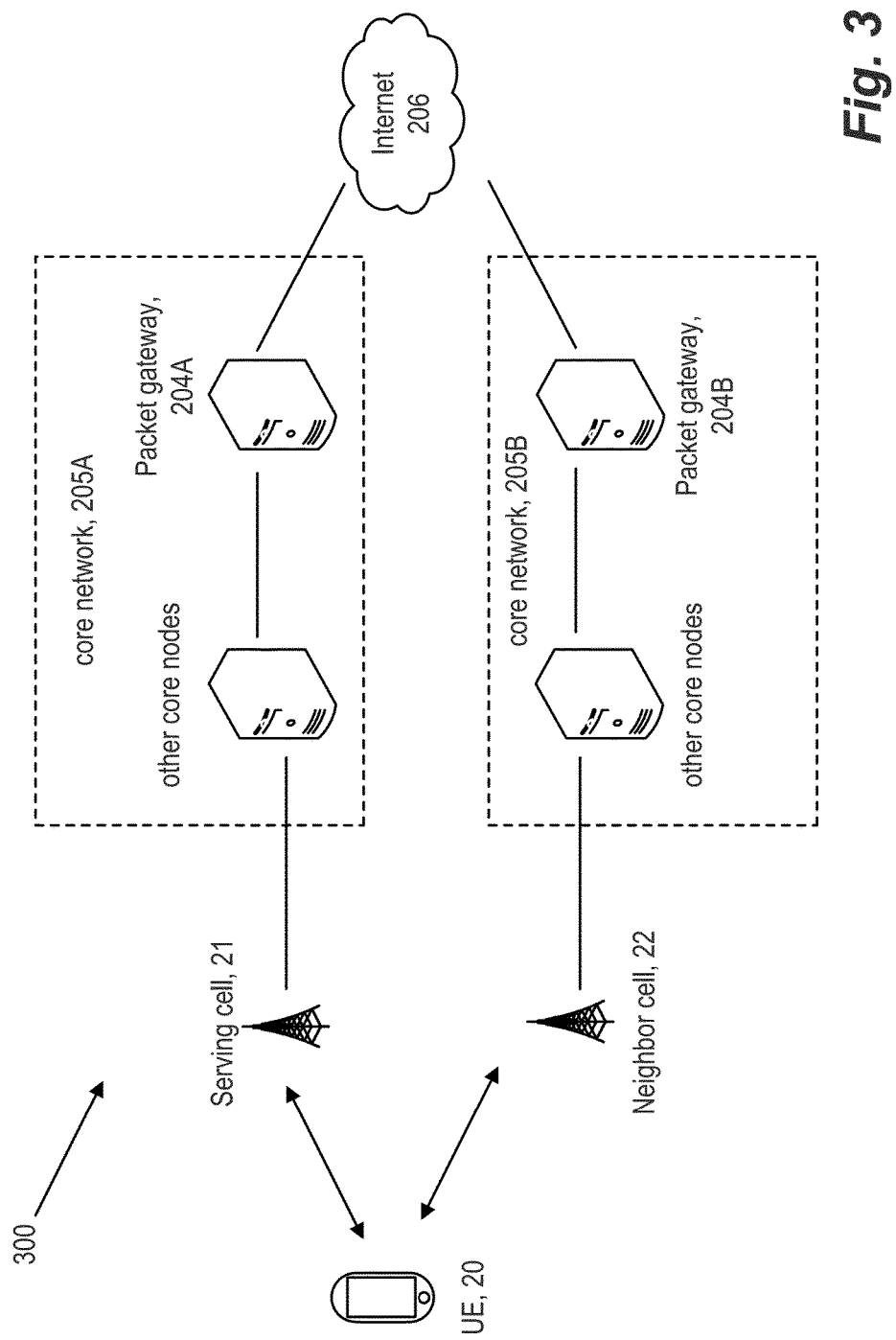
FIG. 3 is an exemplary illustration of a radio environment, according to certain embodiments.

FIG. 3 is an exemplary illustration of a radio environment 300, according to certain embodiments. In the radio environment 300, the serving cell 21 and the neighbor cell 22 may use different core networks 205A and 205B, which have corresponding packet gateways 204A and 204B. In this example, the serving cell 21 and the neighbor cell 22 may or may not be controlled by the same network operator. In addition, the link from the core network 205A/205B to the external network (Internet 206) passes through different packet gateways 204A/204B. For simplicity, the other core network nodes in the core networks 205A/205B are represented as a single node but it can be understood there may be multiple other entities/servers apart from the packet gateways 204A/204B in each of the core networks 205A/205B, such as the nodes 201/202/203 shown in FIG. 2.

In addition, the UE 20 can have a PDN connection through the serving cell 21 which represents a first PLMN. When first registering to the first PLMN, the UE 20 receives a list of equivalent PLMNs from the network. If the neighbor cell 22 represents a second ePLMN that was among the equivalents to the first PLMN in the list that the UE 20 received when first registering to the first PLMN, then the UE 20 may anticipate that the APN and the IP version that has been successfully used with the first PLMN may be suitable for use in the second ePLMN that is equivalent.

Assuming that the APN and IP used with the first PLMN can also be successfully used with the second ePLMN may be valid for some network operations, according to certain embodiments. Some network operators control an ePLMN that is equivalent as PLMN equivalency is currently defined in 3GPP, and so would be included in the PLMN equivalents list that the UE 20 receives. However, the first PLMN and second ePLMN may not be equivalent in all respects necessary to establish a new PDN connection for the UE 20 with that ePLMN.

With respect to the radio environment 300, network procedures may dictate that the neighbor cell 22 attempts to establish a PDN connection for the reselecting UE 20 using the an APN and IP version the matches the APN and IP version that the UE 20 used for the successful PDN connection with the serving cell 21. If the packet gateway 204B used by the neighbor cell 22 has a different APN and/or uses a different IP version for packet data than that of packet gateway 204A used by the serving cell 21, the requested PDN connection may fail. In certain embodiments, the neighbor cell 22 may inform the UE 20 of this failure via a PDN Connectivity Reject message, and indicate in the message the SM cause value corresponding to a reason for the connection failure. From that SM cause value, the UE 20 may then determine that it may not be able to obtain a PDN connection with the second ePLMN and then attempt to get a packet connection in some other manner. In addition, if no other PLMNs are available, the UE 20 may abandon connection attempts and lose connectivity.

In some implementations, the UE 20 may be able to obtain a PDN connection with the ePLMN by using an APN and/or IP version associated with the second ePLMN. However, conventional SM cause values may not provide sufficient information to the UE 20 regarding the availability of the ePLMN. For example, the processing circuitry of the UE 20 may not be able to determine if the ePLMN for which the PDN connection was denied is truly not available for the UE 20 or if the requested PDN connection cannot be established due to the APN and/or IP version in the PDN connection request that is not compatible with the packet gateway used by the ePLMN. However, adding a new SM cause value may not be suitable for legacy UEs already deployed in the stream of commerce. According to the teachings on the present disclosure, a new information element (IE) can be used, which is referred to as a Cause Type IE. The SM cause type IE provides additional information to the UE 20 regarding types of causes in session management messages.

The SM cause type IE can optionally be implemented by network operators and may solve the problem encountered by certain network operators (e.g., Telia-Sonera) where the network operators have service offerings corresponding to what 3GPP's SA1 specifies are ePLMNs for PLMN selection, reselection, and handovers. Network operators that can implement the SM cause type IE include network operators having PLMNs which are considered equivalent to another PLMN that is connected to the UE 20 but may be unable to establish a corresponding PDN connection to the UE 20 due to unequal APNs, IP versions, or the like. In certain embodiments, network operators having PLMNs that are not equivalent at the service level, such as GERAN, UTRAN, and LTE network operators, can fulfill the SA1 specification of equivalent networks by not including the SM cause type IE in the reject message or by configuring the SM cause type IE such that no further information about the accompanying cause value is included in the SM cause type IE.

FIG. 4A is an exemplary table illustrating bit positions for a first octet of a SM cause type IE, according to certain embodiments. In the example shown by FIG. 4A, bit position "1" includes information related to the ePLMN. The SM cause type IE can be extendable to include additional information in the other bit positions, which may be used to address future enhancements in order to provide network operators more flexibility with network configuration. For example, if the SM cause type IE were radio access technology (RAT) specific (e.g., LTE, UTRAN, GERAN), then one or more additional bits could be used beyond what is shown in FIG. 4A to indicate the specific RAT. Adding the one or more additional bits to specify the RAT may be useful for certain networks, such as in North America, which have a configuration where an APN may not be available in the LTE RAT but may be available in GERAN/UTRAN. In some implementations, the SM cause type IE is signaled to the UE 20 within an associated PDN Connectivity Reject message along with the cause value IE described in FIGS. 1A and 1B (and possibly also in other messages that indicate a cause value).

FIG. 4B illustrates exemplary values for an ePLMN bit, according to certain embodiments. The ePLMN bit can include the bit in position "1," or the least significant bit of the SM cause type IE. For example, a value of 1 for the ePLMN bit indicates that the accompanying SM cause value is applicable for the PLMN to which the UE 20 is currently connected in addition to any equivalent PLMNs. In one implementation, the UE 20 attempts a PDN connection with a PLMN with Packet Data Protocol (PDP) type IP version 6 and receives a PDN Reject Message with cause value #50, which indicates that only IP version 4 is allowed. The SM cause type IE PLMN bit that is set to 1 indicates that the cause value #50 is applicable to the current PLMN and all equivalent PLMNs. In addition, a value of 0 for the ePLMN bit indicates that the SM cause type IE includes no additional information about the accompanying SM cause value. According to one implementation, bits two, three, and four of the octet for the SM cause type IE are considered to be spare bits and can be set to zero. In other implementation, bits two, three, and four can be used to indicate a specific RAT for the SM cause type IE.

These values for the ePLMN bit are exemplary, and in other implementations, the bit values may have the opposite meanings, and/or the ePLMN bit values may be positioned in other positions than bit position "1" of the octet of the SM cause type IE. In one implementation, the SM cause type IE described by FIGS. 4A and 4B are published in a relevant radio standard so that the meaning and bit positions/bit values can be unequivocal to both the network entities and the UEs implementing the teachings described herein. For example, one such published standard for UTRAN is 3GPP TS 24.008; another for E-UTRAN is 24.301 and describes evolved packet system (EPS) session management (ESM) cause values as opposed to SM cause values.

According to certain embodiments, the SM cause type IE includes a time/length/value (TLV) format that can be modified and/or extended. For example, IE formats are detailed at 3GPP TS 24.0007. The TLV format enables the length field L to define a length for the next subsequent value field V, so that an amount of information in that value field can be tailored for a particular use and yet still be properly decoded by the UE 20 that reads the length field. In another embodiment, the new SM cause type IE has the format Value (V) as described by FIGS. 4A and 4B where the length is fixed at one octet. This implementation with the fixed length can represent a lighter signaling load on the air interface than the TLV implementation with the changing length. In addition, in some implementations, using four of the eight bits in the fixed-octet implementation may enable the 3GPP to define the cause type, RAT, and other values related to the SM cause type IE.

In addition, publishing the SM cause type IE in a RAT standard may not adversely affect those network operators whose SA1-equivalent PLMNs are also fully equivalent on the service level. For example, use of the SM cause type IE may be optionally implemented so that the SM cause type IE does not affect the operations of network operators that do not experience the PLMN equivalency problems described herein. In addition, use of the SM cause type IE may reduce a need for UE manufacturers and software suppliers to create proprietary solutions that each network may need to be able to handle regardless of whether or not the networks experience the above-described PLMN equivalency problems.

Additionally, the SM cause type IE and associated functionality may also be implemented in mobility management layers, such as in particular situations where diversity of network configurations can be detected. For example, the information used initially in one or more of the spare bits of the SM cause type IE as described in FIG. 4B may eventually be made into a new IE to be defined for mobility management.

Figure 5A:
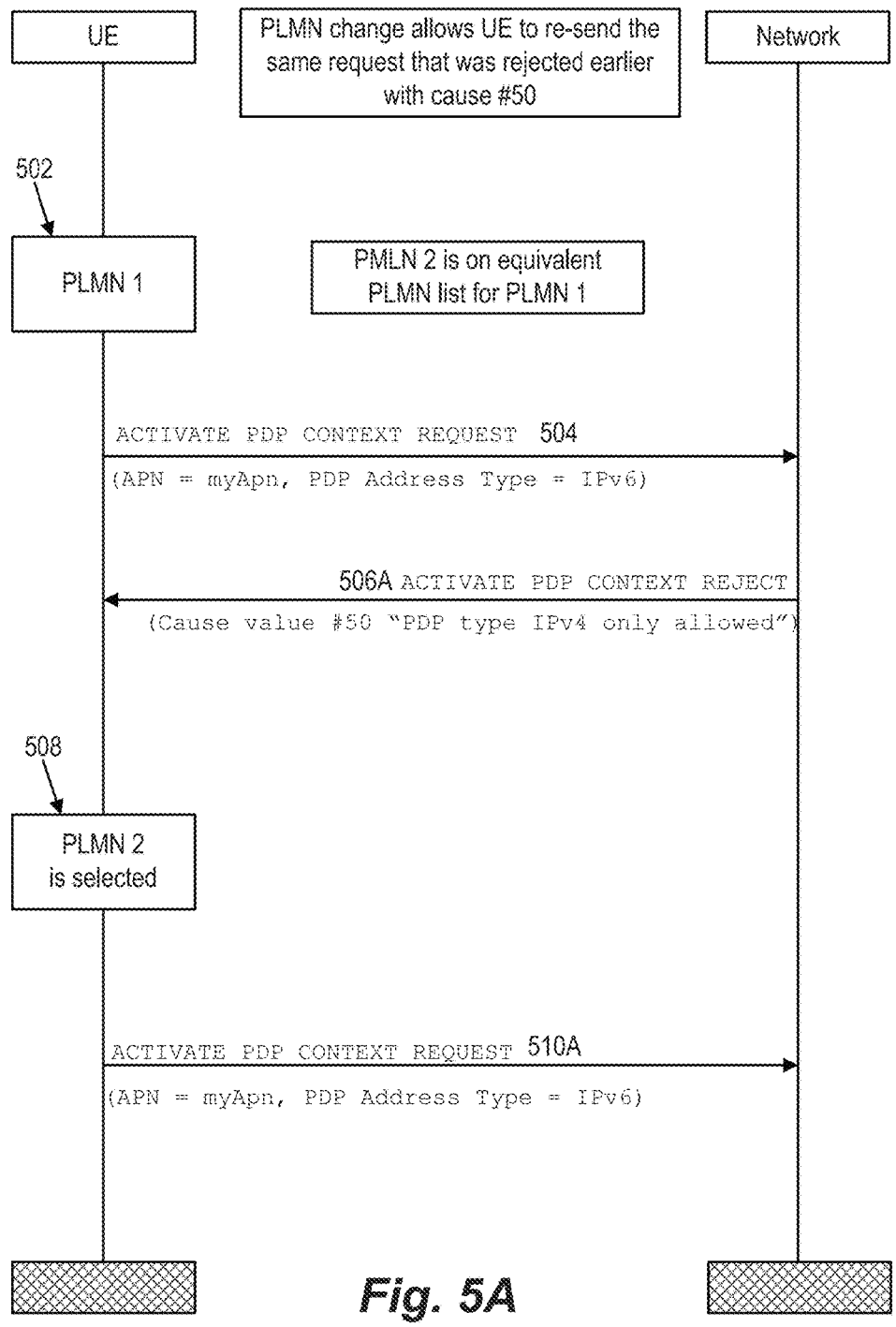
FIG. 5A is an exemplary signaling diagram, according to certain embodiments.

FIG. 5A is an exemplary signaling diagram of an attempt by the UE 20 to establish PDN connectivity to a second PLMN (PLMN 2), according to certain embodiments. According to the example of FIG. 5A, PLMN 2 is listed as an equivalent to a first PLMN (PLMN 1). For example, the UE 20 may receive such an equivalent list when the UE 20 registers to PLMN 1. At FIG. 5A, at step 502, the UE 20 selects PLMN 1 and requests PDN connectivity by sending an Activate PDP Context Request message 503 to the network which includes the APN and IP version (PDP address type=IP version 6) for the PLMN gateway. In response to the Activate PDP Context request message 503, the network replies with an Activate PDP Context Reject message 506A that has a cause value #50, which means that the reason for the rejection is that the relevant gateway (which has the requested APN) only allows PDP type IP version 4.

Being rejected on PLMN 1, at step 508, the UE 20 then selects PLMN 2 which is listed as an equivalent of PLMN 1, and attempts to establish PDN connectivity on PLMN 2 by sending a new Activate PDP Context Request message 510A to the network. In the example of FIG. 5A, the UE 20 sends both requests 504, 510A to the same network but in some implementations, the requests may go to different operators, depending on which network operators operate the PLMNs. In addition, the Activate PDP Context Request message 510A utilizes the same APN and the same IP version as the earlier request message 504 so that essentially the same message requesting connectivity on PLMN 2 was used to request connectivity on PLMN 1.

FIG. 5A also includes the end result that a PLMN change allows the UE 20 to re-send the same (matching) request 510A for a new PLMN 2 that was earlier rejected (504 and 506A) for PLMN 1 by a specific cause value (#50 in this case). According to certain embodiments, some network operators may be able to establish the requested connection to PLMN 2 at step 510A, but in other embodiments, other network operators may be unable to establish the requested connection to PLMN 2 despite the 3GPP/SA1 equivalence of PLMN 1 and PLMN 2.

Figure 5B:
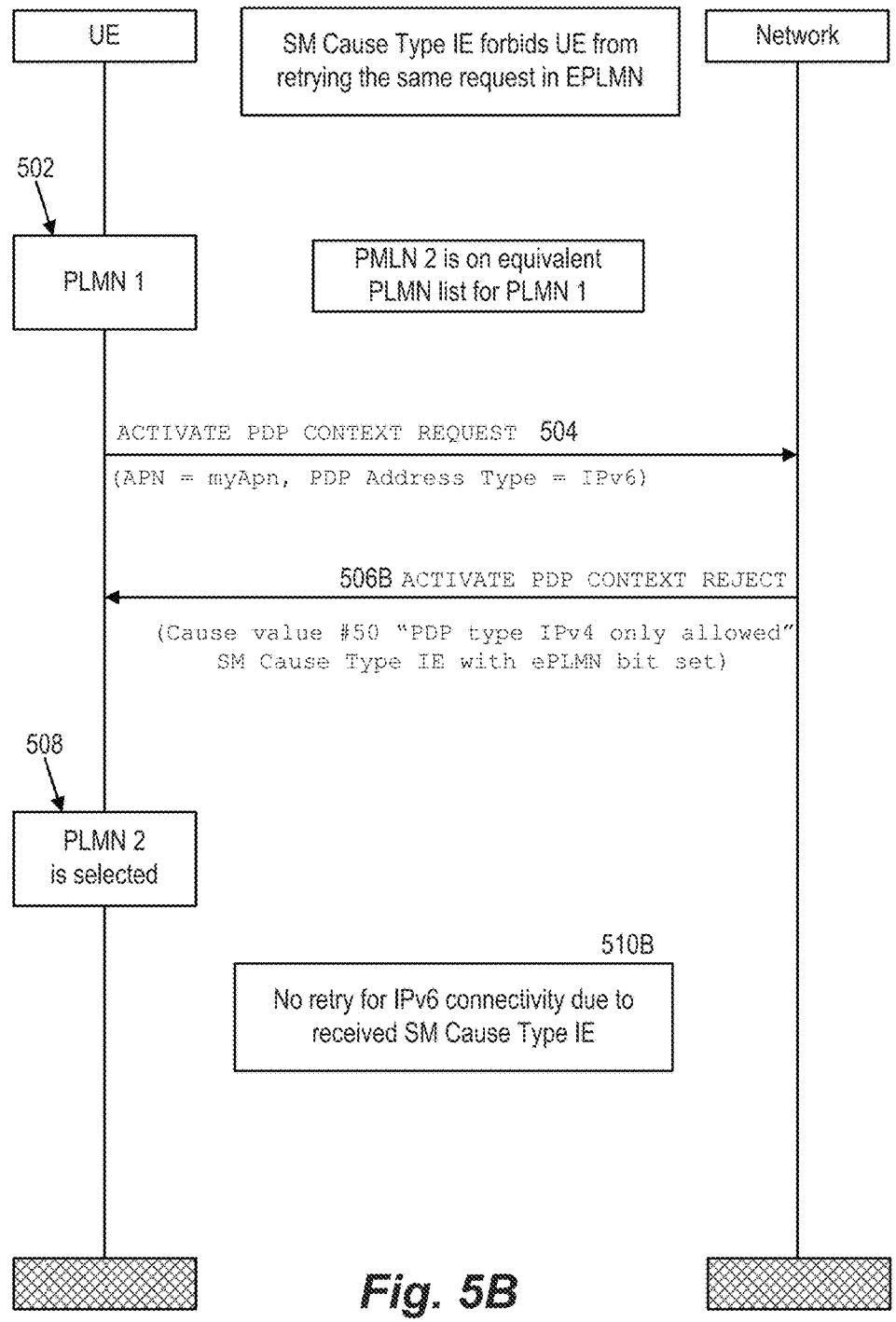
FIG. 5B is an exemplary signaling diagram, according to certain embodiments.

FIG. 5B is an exemplary signaling diagram that incorporates the SM cause type IE, according to certain embodiments. The SM cause type IE used in the signaling diagram of FIG. 5B forbids the UE 20 from retrying the same request in an equivalent PLMN after receiving a reject message from the network. Steps 502 and 508, and message 504 are as described for FIG. 5A. The reject message 506B in FIG. 5B differs from the reject message 506A of FIG. 5A in that the reject message 506B further includes the SM cause type IE with the ePLMN bit set to "1" as defined in FIG. 4B, which means that the cause value #50 is applicable for PLMN 1 (the PLMN in which that cause value was received) as well as in all equivalent PLMNs. After the UE 20 selects PLMN 2 at step 508, at 510B, the ePLMN bit set in the SM cause type IE prevents the UE 20 from trying to connect to the equivalent PLMN 2 using the same parameters as the original request message 504. In this example, the gateway for PLMN 2 is compatible with IP version 4 but not IP version 6, so if the UE 20 in FIG. 5B were to submit a request for PDN connectivity on PLMN 2 that requested IP version 4, the network can accept the request as long as no other bars to connectivity exist, such as congestion, failed authentication, and the like.

While the exemplary embodiments described previously detail a specific Layer 3 (L3) message encoding of the described information carried in the new cause type IE, this is only one particular but non-limiting implementation of these teachings. Another type of IE and/or the information described herein for the SM cause type IE can be delivered to the UE 20 in alternative ways. For example, when the UE 20 initially registers to the network, the UE 20 can receive a message from a registered PLMN (RPLMN) that identifies which PLMNs that are otherwise equivalent by the 3GPP SA1 definition are not equivalent at the service level for a given network operator or for the operator providing the list. The message received from the RPLMN may be distinct from the PLMN equivalent list or may be included as a modification to the PLMN equivalent list. In another implementation, the PLMN equivalent list may include information associated with a cause timer or a back-off timer. For example, the UE 20 can use the cause timer value in conjunction with the cause value and SM cause type IE to provide a predetermined amount of time before next attempting to establish a PDN on the PLMN in which the cause value was received.

In another example that may be implemented by individual mobile device manufacturers, rather than clearing local memory of rejections related to the change of PLMN, the UE 20 can instead, in certain known operator networks, maintain the PLMN rejections in the local memory of the when changing to an ePLMN. The UE 20 can then check the local memory for a previous ePLMN rejection. If the SM cause type IE (or other alternative method of informing the UE 20) informed the UE 20 that the corresponding cause value was valid for all the equivalent PLMNs then the UE 20 may not attempt to establish a PDN connection with that previously-rejected ePLMN. In addition, the UE 20 can obtain and/or determine a renewed APN and/or IP version that will be supported by the network operator for the ePLMN for the initial attempt at establishing a PDN connection.

For the messaging that is implemented to inform the UE 20 about PLMN rejections for ePLMNs, if the network sends a reject cause which denies future actions from the UE 20, the network can additionally inform the UE 20 (preferably but not necessarily at the same time) whether the rejection concerns only the current RPLMN or also any equivalent ePLMNs. In addition, the network can also inform the UE 20 whether a PDN connection establishment for the current PLMN would apply to only that PLMN or also equivalent PLMNs when the UE 20 registers to the network (e.g., in an Attach or Attach Confirm/Complete message), or during routine network position updates such as location update (LU), registration area update (RAU) and/or tracking area update (TAU).

Figure 6:
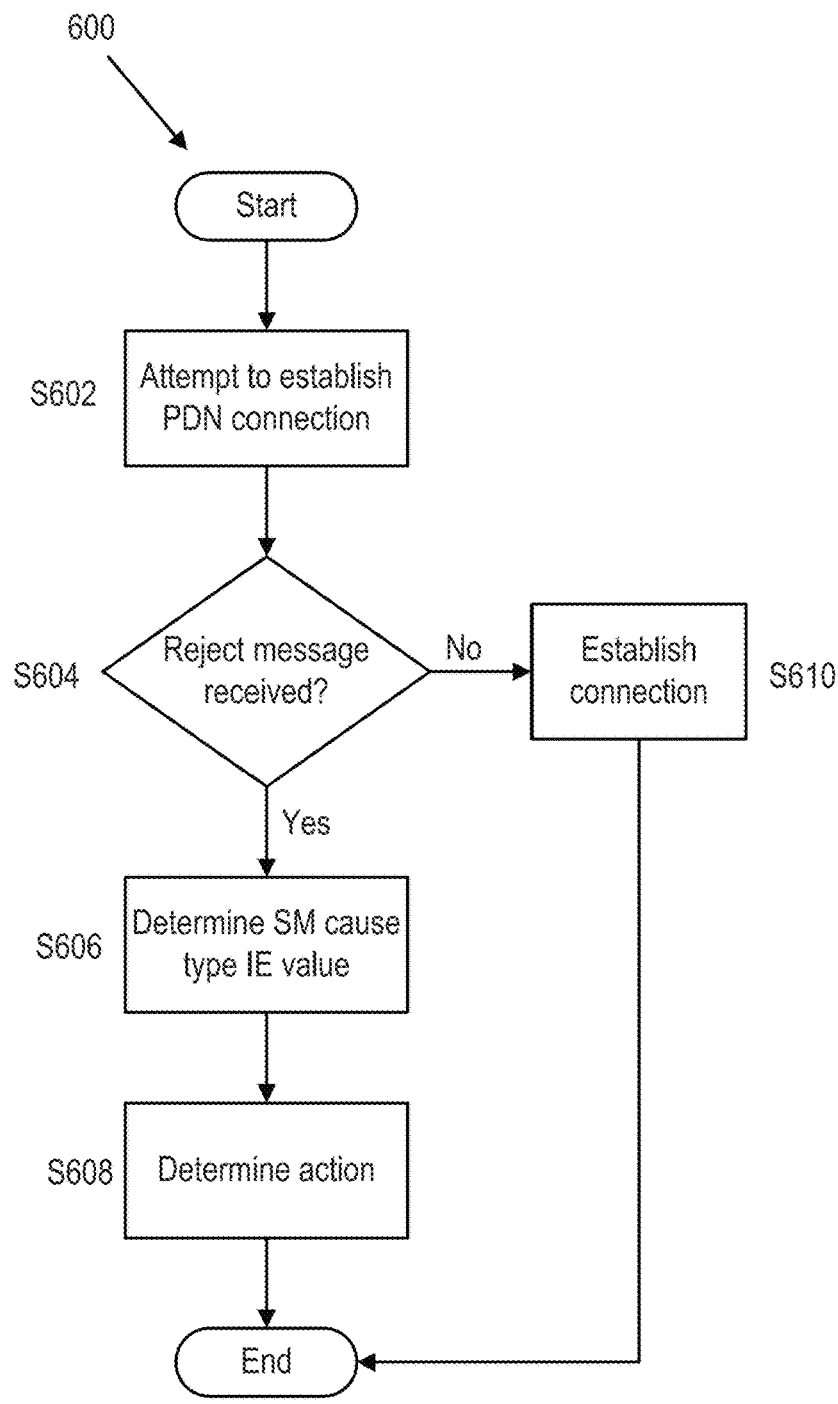
FIG. 6 is an exemplary flowchart of a connectivity request process, according to certain embodiments.

FIG. 6 is an exemplary flowchart of a connectivity request process 600, according to certain embodiments. At the start of the process, the UE 20 has a PDN connection through the serving cell 21 which represents a first PLMN. The first PLMN with which the UE 20 has a PDN connection can be referred to as a current PLMN or RPLMN. When the UE 20 makes the PDN connection with the first PLMN, the processing circuitry of the UE 20 receives a list of PLMNs that are considered to be equivalent to the first PLMN based on the 3GPP standard.

At step S602, the processing circuitry of the UE 20 attempts to establish a PDN connection with a second PLMN that is on the list of equivalent PLMNs received by the UE 20 when connecting to the current PLMN. For example, the UE 20 can select the second PLMN and request PDN connectivity by sending an Activate PDP Context Request message to the network which includes the APN and IP version for the PLMN gateway. In one implementation, the IP version selected by the UE 20 for the PLMN gateway is IP version 6.

At step S604, the processing circuitry of the UE 20 determines whether a reject message has been received from the network. For example, the processing circuitry of the UE 20 can receive a PDP Context Reject message from the network in response to the request message if at least one of the requested APN and IP version are not compatible with the requested PLMN. In some implementations, the reject message can include at least one of a cause value and a SM cause type IE. If the UE 20 receives a reject message from the network, resulting in a "yes" at step S604, then step S606 is performed. Otherwise, if the UE 20 receives a network acceptance message, resulting in a "no" at step S610, then step S610 is performed.

At step S610, the UE 20 receives a network acceptance message in response to the PLMN request message, then the UE 20 can proceed with establishing the PDN connection to the second PLMN. The network can accept the PDN connection request as long as no other bars to connectivity exist, such as congestion, failed authentication, and the like.

At step S606, if the UE 20 has received a reject message from the network, the processing circuitry of the UE 20 determines the SM cause type IE value. The ePLMN bit can include the bit in position "1," or the least significant bit of the SM cause type IE. For example, a value of 1 for the ePLMN bit indicates that the accompanying SM cause value is applicable for the PLMN to which the UE 20 is currently connected in addition to any equivalent PLMNs. In one implementation, the UE 20 attempts a PDN connection with a PLMN with PDP type IP version 6 and receives a PDN Reject Message with cause value #50, which indicates that only IP version 4 is allowed. The SM cause type IE PLMN bit that is set to 1 indicates that the cause value #50 is applicable to the current PLMN and all equivalent PLMNs. In addition, a value of 0 for the ePLMN bit indicates that the SM cause type IE includes no additional information about the accompanying SM cause value. According to one implementation, bits two, three, and four of the octet for the SM cause type IE are considered to be spare bits and can be set to zero. In other implementation, bits two, three, and four can be used to indicate a specific RAT for the SM cause type IE.

At step S608, the processing circuitry of the UE 20 determines an action in response to the cause value and SM cause type IE value in the reject message. For example, if the UE 20 receives a reject message from the network in response to an attempt to the second PLMN that is considered to be equivalent to the current PLMN, the processing circuitry of the UE 20 may cease future connection attempts to the second PLMN. In addition, the UE 20 may attempt connection to the second PLMN using modified connection parameters (e.g., APN, IP version) that are different than those parameters used when the reject message was received. The UE 20 may also attempt to connect to another equivalent PLMN using the modified connection parameters.

A hardware description of the UE 20 according to exemplary embodiments is described with reference to FIG. 7. In addition, the hardware described by FIG. 7 can also apply to the circuitry associated with the serving cell 21, the neighbor cell 22 and other higher level network entities associated with the MAC (L2) and network layer (L3). The processes described herein can also be performed by processing circuitry of a processor designed and programmed specifically to optimally perform the connectivity request process 600 described previously herein. Implementation of the connectivity request process 600 on the hardware described herein improves the ability of the UE 20 to respond to reject messages sent in response to an equivalent PLMN connection request.

The UE 20 includes a CPU 700 that perform the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the UE 20 communicates, such as the serving cell 21 and/or the neighbor cell 22.

Further, the claimed advancements may be provided as a utility application, background daemon, or component of an operating system, or combination thereof, executing in conjunction with CPU 700 and an operating system such as Microsoft Windows 7, UNIX, Solaris, LINUX, Apple MAC-OS and other systems known to those skilled in the art.

The hardware elements in order to achieve the UE 20 may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

Figure 7:
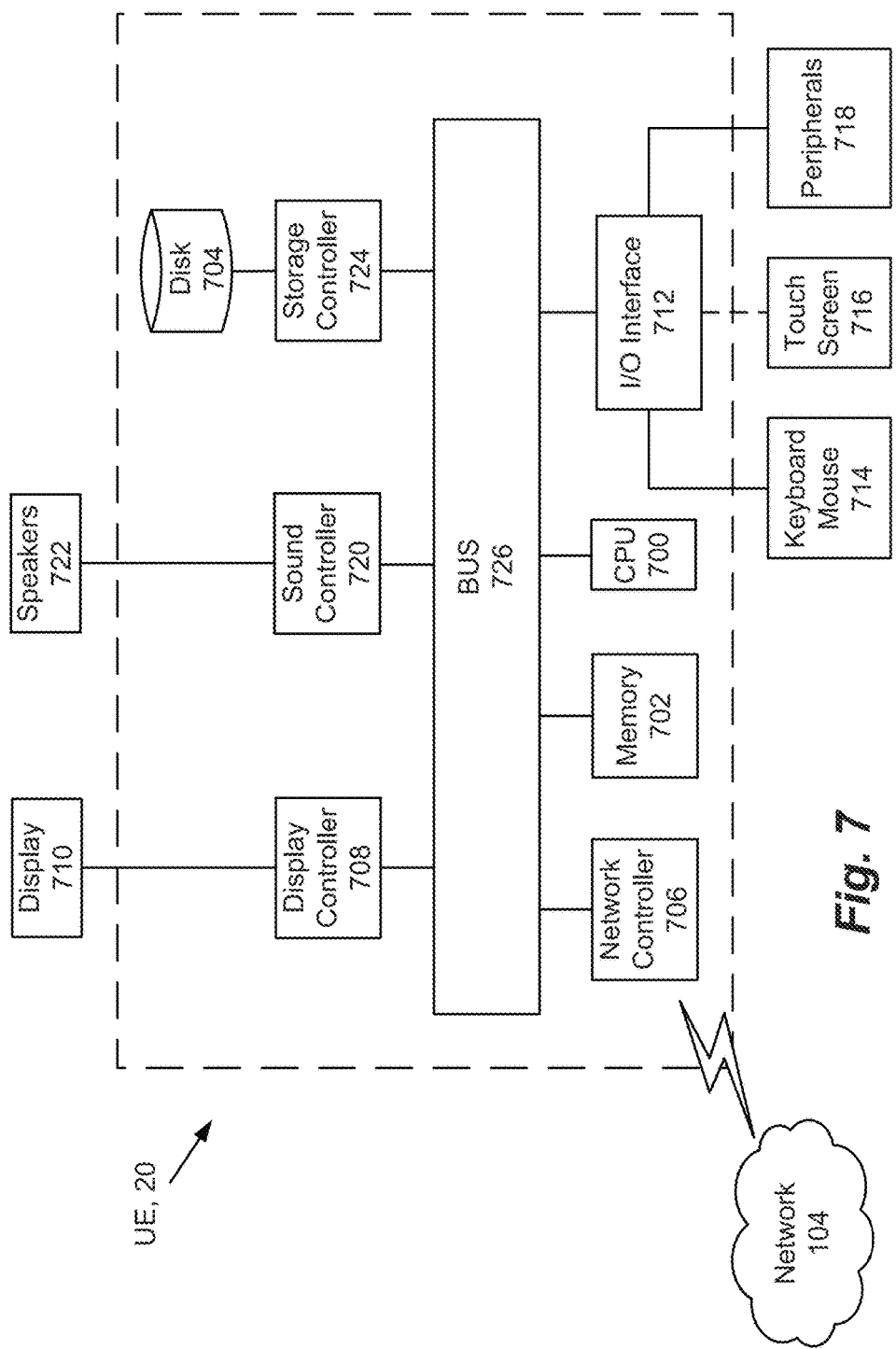
FIG. 7 is a non-limiting example of a UE, according to certain embodiments.

The UE 20 in FIG. 7 also includes a network controller 706, such as an Intel Ethernet PRO network interface card from Intel Corporation of America, for interfacing with network 104. As can be appreciated, the network 104 can be any E-UTRAN/LTE network but can also be a public network, such as the Internet, or a private network such as an LAN or WAN network, or any combination thereof and can also include PSTN or ISDN sub-networks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

In addition, while not particularly illustrated for the UE 20, serving cell 21, and neighbor cell 22, these devices can include a modem and/or a chipset and/or an antenna chip which may or may not be inbuilt onto a radiofrequency (RF) front end module within the respective host device. These devices can also include transmitter and receiver hardware for wireless communications between the UE 20, serving cell 21, and neighbor cell 22.

The UE 20 further includes a display controller 708, such as a NVIDIA GeForce GTX or Quadro graphics adaptor from NVIDIA Corporation of America for interfacing with display 710 of the UE 20, such as a Hewlett Packard HPL2445w LCD monitor. A general purpose I/O interface 712 at the UE 20 interfaces with a keyboard and/or mouse 714 as well as a touch screen panel 716 on or separate from display 710. General purpose I/O interface 712 also connects to a variety of peripherals 718 including printers and scanners, such as an OfficeJet or DeskJet from Hewlett Packard.

A sound controller 720 is also provided in the UE 20, such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the UE 20. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

In other alternate embodiments, processing features according to the present disclosure may be implemented and commercialized as hardware, a software solution, or a combination thereof. Moreover, instructions corresponding to connectivity request process 600 in accordance with the present disclosure could be stored in a thumb drive that hosts a secure process.

Figure 8:
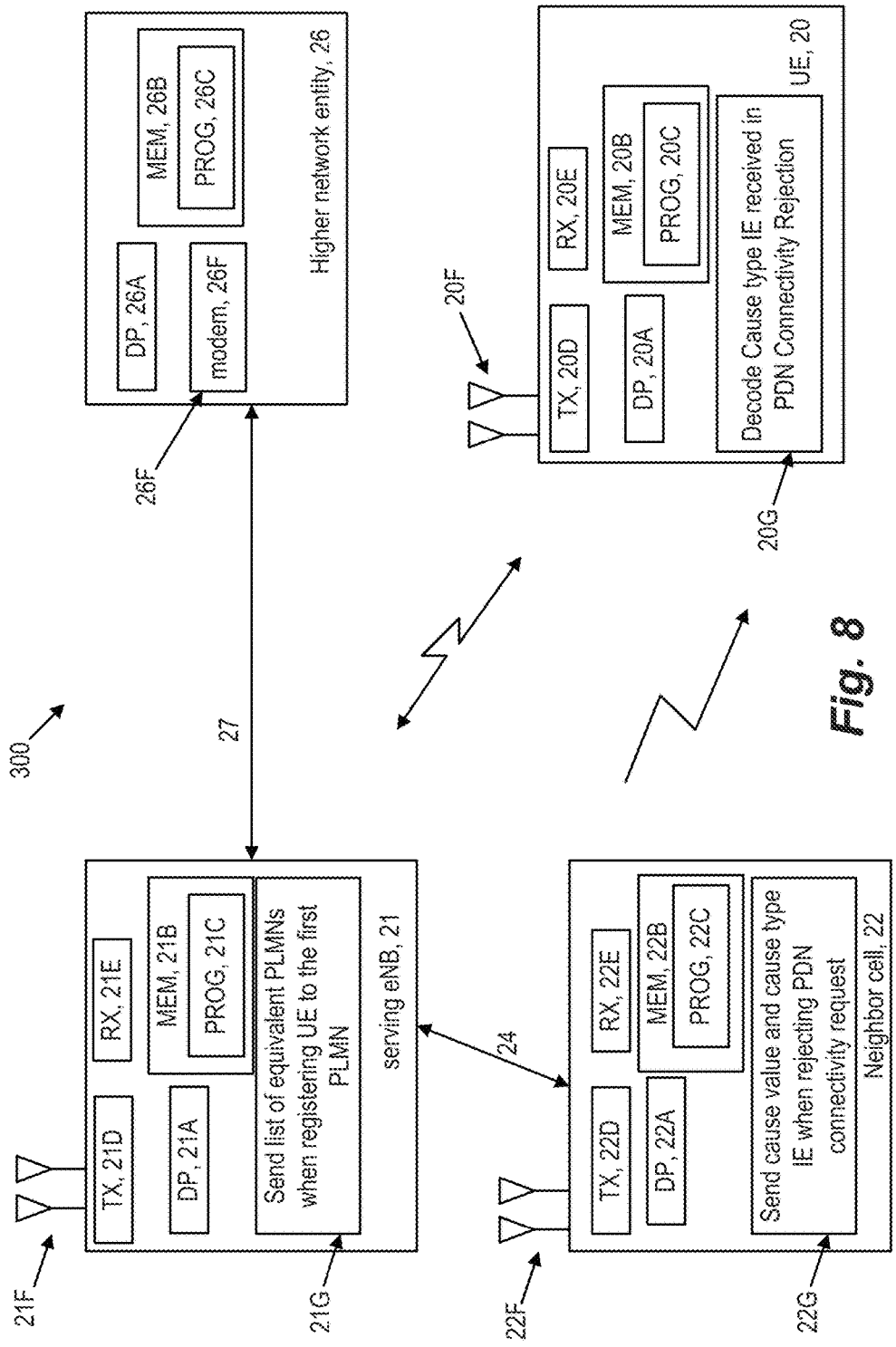
FIG. 8 is a high level schematic block diagram of the radio environment, according to certain embodiments.

FIG. 8 is a high level schematic block diagram of the radio environment 300, according to certain embodiments. The components of the radio environment 300, such as the serving cell 21, neighbor cell 22, and UE 20, include one or more hardware devices for practicing the exemplary embodiments of the teachings described herein. For example, the UE 20 includes a processor, such as at least one data processor (DP) 20A, which can also be referred to as processing circuitry, memory such as at least one computer-readable memory 20B storing instructions for executing at least one software program 20C, and also communication circuitry that can include a transmitter TX 20D and a receiver RX 20E for bidirectional wireless communications with the serving cell 21 using the operative radio access technology. Wireless communications can be performed via one or more antennas 20F. One of the PROGs 20G in the MEM 20B of the UE 20 can issue software instructions to the circuitry of the DP 20A to decode from the PDN connectivity reject message received from the neighbor cell 22 based on the cause value and the value of the SM cause type IE as described previously herein.

The serving cell 21 and the neighbor cell 22 also shown in FIG. 8. Each of these cells 21/22 also have at least one DP/processing circuitry 21A/22A, a MEM 21B/22B storing a PROG 21C/22C, and communication circuitry such as transmitters 21E/22E and receivers 21D/22D that interface to one or more antennas 21F/22F. One of the relevant PROGs 21G in the MEM 21B of the serving cell 21 includes software instructions to send to the UE 20 a list of equivalent PLMNs when the UE 20 registers the first PLMN that is represented at FIG. 8 by the serving cell 21. The PROGs 22G in the MEM 22B of the neighbor cell 22 includes software instructions to send to the UE 20 a cause value and a cause type IE as detailed herein, when the neighbor cell 22 rejects the UE's request for PDN connectivity to the second ePLMN when appropriate, where the neighbor cell 22 in FIG. 6 represents the second ePLMN and the second ePLMN is on the list of equivalent PLMNs provided by the serving cell 21 to the UE 20.

FIG. 8 additionally shows a higher network node 26 also having a DP/processing circuitry 26A, a MEM 26B storing PROGs 26C, and a modem for modulating and demodulating signals to/from the serving cell 21 over the control and data link. In some cases the neighbor cells 22/23 may also communicate with the higher network entity 26, and the serving cell 21 may also communicate via an X1 or other interface 24 with one or more of the neighbor cells 22/23.

At least one of the PROGs 20C/20G in the UE 20 can include one or more software instructions that, when executed by the associated DP/processing circuitry 20A, enable the device to operate in accordance with the exemplary embodiments of the disclosure, as described herein. Similarly, for the PROGs 22C/22G in the neighbor cell 22 and the PROGs 26C in the MEM 26B of the higher network entity 26 can also include one or more software instructions that, when executed by the associated DP/processing circuitry 21A/26A, enable the devices to operate in accordance with the exemplary embodiments of the disclosure, as described herein.

The exemplary embodiments of this disclosure may be implemented at least in part by computer software stored on the MEM 20B/21B/22B which is executable by the DP/processing circuitry 20A/21A/22A of the UE 20 and/or serving cell 21, neighbor cell 22, or higher network entity 26; or by hardware, or by a combination of tangibly stored software and hardware (and tangibly stored firmware) in any one or more of the MEMs 20B/21B/26B. In this manner the respective DP/processing circuitry 20A/21A/26A with the MEM 20B/21B/26B and stored PROG 20C/20G/21C/21G/22C/22G may be considered a data processing system. Electronic devices implementing these aspects of the invention may not include the entire UE 20 or eNB 21, 22/23 as depicted at FIG. 8, but instead may be one or more components thereof such as the above described tangibly stored software, hardware, firmware and DP/processing circuitry, and/or a system on a chip SOC and/or an application specific integrated circuit ASIC and/or a digital signal processor DSP (including multiple core processors and other arrangements of circuitry) and/or a modem and/or an antenna module and/or a radiofrequency RF front end module.

In general, the various embodiments of the UE 20 can include, but are not limited to personal portable digital devices having wireless communication capabilities, such as for example cellular and other mobile phones including smartphones, navigation devices, laptop/palmtop/tablet computers, digital cameras and music devices, Internet appliances, USB dongles and data cards. Such portable digital devices may be implemented as radio communications handsets, wearable radio communications terminals, implanted radio communications terminals, and/or combinations of these.

Various embodiments of the computer readable MEMs 20B/21B/23B/26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A/21A/23A/26A include but are not limited to general purpose computers, special purpose computers, microprocessors, digital signal processors (DSPs) and multi-core processors, though in other embodiments the implementing hardware is more generally characterized as circuitry.

Various modifications and adaptations to the foregoing exemplary embodiments of this invention may become apparent to those skilled in the relevant arts in view of the foregoing description. While the exemplary embodiments have been described above in the context of the E-UTRAN/LTE and LTE-Advanced radio access technology, as noted above the exemplary embodiments of this invention are not limited for use with only these particular types of wireless radio access technology networks.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A device, comprising:
   circuitry configured to
      establish a packet data network (PDN) connection with a first public land mobility network (PLMN) operated by a first network operator;
      send a second PDN connection request to a second PLMN, the second PDN connection request including connection parameters that match connection parameters of the first PLMN, the second PLMN operated by a second network operator and the second PLMN being equivalent to the first PLMN;
      determine at least one action based on receiving a reject message, from the second PLMN, having at least one of a cause value and a cause type; and
      determine that one or more of the connection parameters of the second PDN connection request are incompatible with the second PLMN based on the cause value of the reject message.

2. The device of claim 1, wherein the circuitry is further configured to determine the cause value from a cause value information element (IE).

3. The device of claim 1, wherein the circuitry is further configured to determine the cause type from a cause type IE.

4. The device of claim 3, wherein the circuitry is further configured to determine the cause type based on at least one bit value of the cause type IE.

5. The device of claim 4, wherein the circuitry is further configured to determine that the cause value is associated with one or more equivalent PLMNs based on the at least one bit value.

6. The device of claim 4, wherein the circuitry is further configured to determine that the cause type provides no additional information related to the cause value based on the at least one bit value.

7. The device of claim 3, wherein the cause type IE includes one or more bits indicating a specific radio access technology (RAT).

8. The device of claim 1, wherein the circuitry is further configured to receive an equivalent PLMN list from the first PLMN including one or more PLMNs that are equivalent to the first PLMN.

9. The device of claim 1, wherein the connection parameters include at least one of an access point name (APN) and an internet protocol (IP) version.

10. The device of claim 1, wherein the circuitry is further configured to determine that the one or more of the connection parameters are incompatible with one or more equivalent PLMNs based on the cause type of the reject message.

11. The device of claim 10, wherein the circuitry is further configured send a modified PDN connection request to the one or more PLMNs with modified connection parameters.

12. The device of claim 11, wherein the circuitry is further configured to determine the modified connection parameters based on the cause value of the reject message.

13. The device of claim 10, wherein the circuitry is further configured to cease connection attempts with at least one of the one or more equivalent PLMNs based on at least one of the cause type and cause value of the reject message.

14. The device of claim 1, wherein the circuitry is further configured to reattempt the second PDN connection request to the second PLMN with modified connection parameters after a predetermined amount of time.

15. The device of claim 1, wherein the circuitry is further configured to store a previous reject messages in a memory.

16. The device of claim 15, wherein the circuitry is further configured to determine configuration parameters for future PDN connection requests based on the previous reject messages.

17. A method, comprising:
   establishing a packet data network (PDN) connection with a first public land mobility network (PLMN) operated by a first network operator;
   sending a second PDN connection request to a second PLMN, the second PDN connection request including connection parameters that match connection parameters of the first PLMN, the second PLMN operated by a second network operator and the second PLMN being equivalent to the first PLMN;
   determining at least one action based on receiving a reject message, from the second PLMN, having at least one of a cause value and a cause type; and
   determining that one or more of the connection parameters of the second PDN connection request are incompatible with the second PLMN based on the cause value of the reject message.

18. A device, comprising:
   circuitry configured to
      establish a packet data network (PDN) connection with a first public land mobility network (PLMN) operated by a first network operator;
      send a second PDN connection request to a second PLMN, the second PDN connection request including connection parameters that match connection parameters of the first PLMN, the second PLMN operated by a second network operator and the second PLMN being equivalent to the first PLMN;
      determine at least one action based on receiving a reject message, from the second PLMN, having a cause type information element (IE);
      send the second PDN connection request to the second PLMN with connection parameters that match the connection parameters of the first PLMN; and
      determine that one or more of the connection parameters of the second PDN connection request are incompatible with the second PLMN based on the cause value of the reject message.

* * * * *